Aug. 21, 1945. C. G. STRANDLUND 2,383,022
PLOW
Filed April 16, 1942
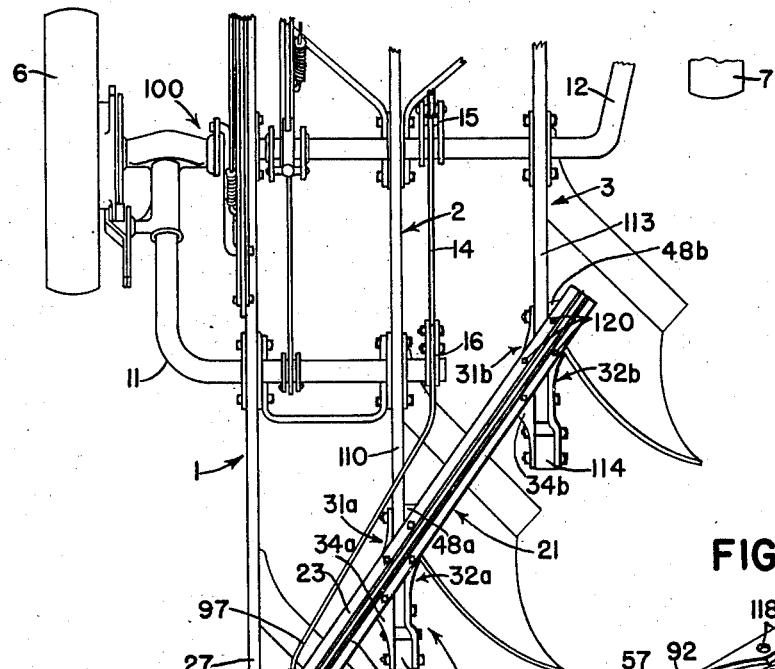
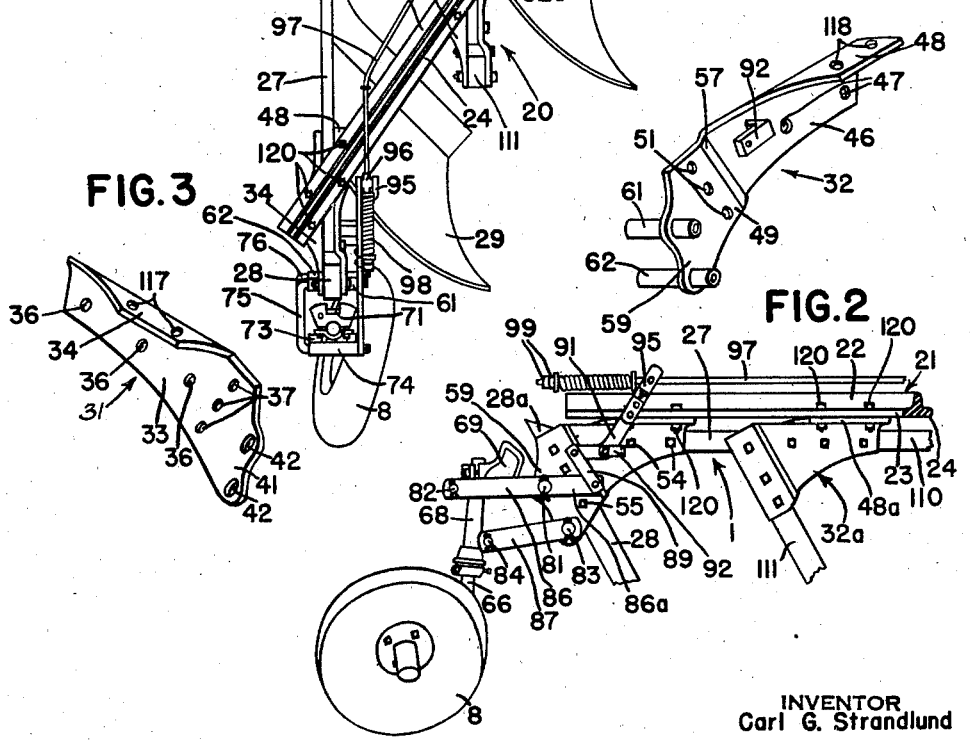
INVENTOR
Carl G. Strandlund
ATTORNEYS Patented Aug. 21, 1945

2,383,022

UNITED STATES PATENT OFFICE 2,383,022

PLOW

Carl G. Strandlund, Moline, Ill., assignor to Deere & Company, Moline, Ill., a corporation of Illinois Application April 16, 1942, Serial No. 439,199

5 Claims. (Cl. 97—198.1)

The present invention relates generally to agricultural implements and more particularly to plows and the like which include laterally spaced generally parallel tool carrying beams which are adapted to be secured together to form a strong rigid framework.

The object and general nature of the present invention is the provision of a plow of the above-mentioned type in which the rear portions of the tool carrying beams are connected together by a new and improved bracing structure. More specifically, it is a feature of this invention to provide a bracing structure in which the brace is made up of a rolled section connected to the several beams by angle brackets. Still further, it is a feature of this invention to provide new and improved brackets for receiving not only the bracing member but also other component parts of the plow. For example, one pair of brackets is particularly formed to receive the rear furrow wheel of the plow, and preferably all of the pairs of brackets are formed so as to serve as strong and sturdy but inexpensive attaching means for connecting the tool standards to their respective draft beams.

These and other objects and advantages of the present invention will be apparent to those skilled in the art after a consideration of the following detailed description, taken in conjunction with the accompanying drawing.

In the drawing:

Figure 1 is a plan view of a three-bottom plow in which the principles of the present invention have been incorporated;

Figure 2 is a fragmentary side view of the rear portion of the plow shown in Figure 1; and Figures 3 and 4 are perspective views of the left and right hand rear brackets.

Referring now to the drawing, more particularly to Figure 1, the plow in which the principles of the present invention have been incorporated comprises a plurality of longitudinally extending laterally spaced tool carrying beams indicated, respectively, by the reference numerals 1, 2 and 3. The beams 1, 2 and 3, taken in conjunction with bracing structure to be described below, comprises the frame of the plow which is supported on a front land wheel 6, a front furrow wheel 7 and a rear furrow wheel 8. The front land wheel 6 is mounted upon the swingable crank axle 11 which is interconnected with a second crank axle 12 upon which the front furrow wheel 7 is mounted as in conventional practice. A link 14 pivotally connects an arm 15 on the crank axle 12 with the corresponding arm 16 on the laterally inner end of the crank axle 11, whereby the front furrow and land wheels move together. The rear furrow wheel 8 and its supporting and controlling mechanism will be described below.

The bracing structure mentioned above is indicated in its entirety by the reference numeral 20 and comprises a diagonally disposed bracing bar 21 which preferably is formed of rolled stock, such as a T-section having a vertical flange 22 and two horizontal flanges 23 and 24. The flanges 23 and 24 are provided with a plurality of openings to receive attaching bolts reference to which will be made below. The bracing structure 20 also includes a plurality of pairs of brackets, one pair of brackets for each of the tool carrying beams 1, 2 and 3. Referring for the moment to Figure 2, the landward beam 1, which is the longest beam of the plow, includes a substantially straight draft beam 27 and a generally downwardly and forwardly extending tool standard 28 to which a rear furrow opener 29 is secured in the usual way. The draft beam 27 and the associated tool standard 28 are secured together by a pair of rear brackets 31 and 32, shown in detail in Figures 3 and 4, respectively. The outside rear bracket 31 (Figure 3) comprises a generally vertically arranged beam receiving section 33 and a generally laterally outwardly directed brace receiving section 34. The beam receiving section 33 is provided with a first set of three openings 36 and a second set of openings 37. The beam receiving section 33 of the bracket 31 is extended rearwardly, as at 41, and is provided with a pair of larger openings 42, the purpose of which will appear later.

The companion bracket member 32 (Figure 4) is of similar construction, having a beam receiving section 46, provided with apertures 47, a brace receiving section 48 and a rear standard receiving section 49 provided with a set of openings 51. The openings 47 and 51 are adapted to be aligned with the openings 36 and 37 (Figure 3), and these openings are, in turn, adapted to be aligned or registered with corresponding openings in the draft beam 27 and the tool carrying standard 28 whereby to receive a plurality of bolts 54 and 55 which, when tightened, firmly and rigidly secure the brackets 31 and 32 to the draft beam 27 and tool standard 28. It will be noted from Figure 1 that the standard 28 is thicker than the beam 27. To accommodate this arrangement, the right hand bracket 32 is provided with an offset portion 57 that provides the necessary close fitting relations between the parts to be connected together.

The right hand bracket 32 is also provided with a rearward extension 59, and this extension is apertured to receive a pair of transversely disposed sleeves 61 and 62 which are preferably welded or otherwise firmly fixed to the bracket 32. The diameter of the openings 42 (Figure 3) is sufficiently large to receive the sleeves 61 and 62 when the brackets 31 and 32 are bolted in place.

The sleeves 61 and 62 serve as parts receiving the wheel supporting means, and referring now to Figures 1 and 2, it will be seen that the rear furrow wheel 8 is mounted at the lower end of a spindle 66 the upper portion of which is mounted for rocking movement about a generally vertical axis in a wheel supporting sleeve member 68. The upper end of the spindle 66 carries a sector 69 having a notch 71 (Figure 1) which engages the upper end 28a of the rear tool standard 28 when the plow is lowered into operating position. Figure 2 shows the parts in the positions they occupy when the plow is in transport or non-operating position. The wheel supporting sleeve member 68 carries a pair of transverse sleeve sections 73 and 74 (Figure 1), and a pair of U-shaped link members 75 and 76 serve to swingably connect the wheel supporting sleeve 68 with the rear end of the plow. The upper link 75 has its ends 81 and 82 (Figure 2) disposed, respectively, in bracket sleeve 61 (Figure 4) and the upper sleeve section 74 on the wheel supporting sleeve 68. The lower link 76 has its ends 83 and 84 disposed, respectively, in the lower bracket sleeve 62 and the lower sleeve 73 on the sleeve member 68. Straps 86 and 87, apertured to receive the link ends 81, 82 and 83, 84 reenforce the link members 75 and 76. The straps 86 and 87 are held in place on the associated link ends by cotter keys or other means.

The upper link member 86 is extended forwardly, as at 86a, to serve as a lever and is connected by a short link 89 to the rear end of a lever 92 that is pivoted on a pin carried by a bracket 92 (Figures 2 and 4) fixed to the right hand attaching bracket 32. The upper end of the link 91 is provided with a hammer strap 95, and between the latter and the main part of the lever 91 is disposed a trunnion 96 in which a link 97 is slidable. The link 97 extends forwardly and is connected to the arm 16 on the land wheel crank axle 11, as shown in Figure 1. A spring 98 is disposed about the rear end of the link 97 for cushioning the raising action. A pair of nuts 99 are threaded onto the rear end of the link and serves to determine the position of the rear furrow wheel 8 when the plow is raised. The crank axle 11 is provided with power lift mechanism indicated in its entirety by the reference numeral 100. This mechanism is of conventional construction and need not be described in detail. When the power lift clutch mechanism is actuated the crank axle 11 is swung downwardly, this movement swinging the arm 16 forwardly and exerting a pull through the link 97. This swings the lever 91 in a clockwise direction (Figure 2), which motion is transmitted by the link 89 to the strap 87, swinging the latter in a counterclockwise direction and raising the rear end of the plow on the rear furrow wheel 8.

It will be noted from Figure 1 that the bracing bar 21 is disposed transversely of the plow beams 1, 2 and 3 in a generally diagonal direction. The laterally extended sections 34 and 48 of the side plates or brackets 31 and 32 are, when the brackets are fixed in position, disposed in a common generally horizontal plane. The plow beams 2 and 3 are also provided with similar brackets except that the rearward extensions 41 and 59 are omitted. Otherwise, the brackets associated with the plow beams 2 and 3 are identical with the brackets 31 and 32 described above, and hence further description is believed to be unnecessary, except to say that the plow beam 2 consists of a draft beam 110 and a tool standard 111 suitably connected together by a pair of side plates or brackets 31a and 32a and that the plow beam 3 consists of a draft beam 113 and a tool standard 114 connected together by a pair of side plates or brackets 31b and 32b. The bracket 31a includes a laterally disposed section 34a and the bracket 32a includes a laterally directed section 48a. Similarly, the bracket 32b includes a laterally directed section 34b and the other bracket 32b includes a laterally directed section 48b. These laterally directed brackets sections 34, 34a, and 34b, and 48, 48a and 48b are all disposed in a common horizontal plane and are provided with apertures 117 and 118 (Figures 3 and 4) to receive bolts 120 that pass downwardly through openings formed in the horizontal flanges 23 and 24 of the T-bar 21. It will be noted from Figure 1 that the laterally directed sections 34, 34a and 34b are formed generally at the rear end of the associated brackets 31, 31a and 31b, and that the other laterally directed sections 48, 48a and 48b are disposed generally at the forward end of the brackets 32, 32a and 32b. This particular arrangement is to accommodate the diagonal disposition of the associated brace bar 21, the flanges of the latter being apertured to provide openings which register with the openings 117 and 118 in the laterally directed bracket sections. By utilizing a brace bar, such as 21, formed of rolled stock and by employing attaching brackets that are formed from plate stock, a rigid bracing structure is provided but without the use of expensive or heavy castings and without any machining operations required.

While I have shown and described above the preferred structure in which the principles of the present invention have been incorporated, it is to be understood that the present invention is not to be limited to the particular details shown and described above, but that, in fact, widely different means may be employed in the practice of the broader aspects of my invention.

What I claim and desire to secure by Letters Patent is:

1. A plow comprising a plurality of generally longitudinally extending beams, a pair of plates, each having a laterally outwardly directed flange, secured to opposite sides of each of said beams, and a brace member extending generally transversely of said beams and secured to the flanges of said side plates.

2. A plow comprising a plurality of plow beams, a pair of brackets secured to each beam on opposite sides thereof, each bracket including a laterally directed section having one or more openings therein, a diagonal bracing bar having a horizontally disposed section and a generally vertically disposed flange, the horizontal section of said bar having openings therein adapted to register with the openings in the laterally directed sections of said brackets, and fastening means passing through said registering openings.

3. A plow comprising a plurality of plow beams, a pair of brackets secured to each beam, one bracket of each pair having a laterally directed section adjacent the forward portion of that bracket and the other bracket of that pair having a laterally directed section adjacent the rear portion of the latter bracket, a bracing member disposed diagonally with respect to said beams, and means securing said bracing member with the laterally directed sections of said pairs of brackets.

4. A plow comprising a plurality of tool carrying structures, each comprising a draft beam, a tool standard, and a pair of connecting brackets rigidly securing the standard to said draft beam, a laterally extending section carried on at least one bracket of each of said pairs of brackets, said laterally extending sections lying substantially in a common generally horizontal plane, and a transverse bracing member secured to said laterally extending sections.

5. A plow comprising a draft beam, a tool standard, a pair of brackets securing said standard to said beam, means for securing said brackets to said beam and standard, each bracket having a rearward extension and one of said extensions being provided with at least one opening, a sleeve carried by the other bracket and disposed in said opening, and wheel-receiving means rockably mounted in said sleeve.

CARL G. STRANDLUND.